(12) United States Patent
Lum et al.

(10) Patent No.: US 7,490,251 B2
(45) Date of Patent: Feb. 10, 2009

(54) METHOD AND APPARATUS FOR CURRENT SHARING ETHERNET POWER ACROSS FOUR CONDUCTOR PAIRS USING A MIDSPAN DEVICE

(75) Inventors: Meilissa Lum, San Jose, CA (US); Kan-Chiu Seto, Saratoga, CA (US); Roger Karam, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 261 days.

(21) Appl. No.: 11/279,689

(22) Filed: Apr. 13, 2006

(65) Prior Publication Data

US 2007/0263675 A1 Nov. 15, 2007

(51) Int. Cl.
*G06F 1/00* (2006.01)
*G05B 11/01* (2006.01)
(52) U.S. Cl. ............. 713/300; 340/310.11; 340/310.12
(58) Field of Classification Search ................ 713/300, 713/340
See application file for complete search history.

(56) References Cited

U.S. PATENT DOCUMENTS

| | | | | |
|---|---|---|---|---|
| 6,095,867 A * | 8/2000 | Brandt et al. | .......... | 439/620.09 |
| 6,179,644 B1 * | 1/2001 | Adams et al. | ................ | 439/387 |
| 6,889,095 B1 * | 5/2005 | Eidson et al. | .................. | 700/12 |
| 7,154,381 B2 * | 12/2006 | Lang et al. | ............. | 340/310.11 |
| 7,353,407 B2 * | 4/2008 | Diab et al. | .................. | 713/300 |
| 2005/0044431 A1 * | 2/2005 | Lang et al. | .................. | 713/300 |
| 2005/0169243 A1 * | 8/2005 | Lehr et al. | .................. | 370/351 |
| 2006/0209875 A1 * | 9/2006 | Lum et al. | .................. | 370/445 |

OTHER PUBLICATIONS

PCT International Search Report and Written Opinion of the International Searching Authority having a date of mailing of Jul. 29, 2008 in co-pending PCT International Patent Application No. PCT/US07/66276, having an International Filing Date of Apr. 10, 2007 and the applicant of Cisco Technology, Inc., and entitled: Method and Apparatus for Current Sharing Ethernet Power Across Four Conductor Pairs Using a Midspan Device.

* cited by examiner

*Primary Examiner*—Suresh K Suryawanshi

(57) ABSTRACT

Methods and apparatus are disclosed for balancing power across all conductors of an Ethernet connection. Balancing circuitry is disclosed to allow an Ethernet midspan device to receive power from an Ethernet Power Sourcing Equipment (PSE) on the signal pairs of an Ethernet connection. The balancing circuitry is configured to sense the level of the received power, and generate a second power source substantially equal to the received power level. The received power is provided to an Ethernet Powered Device (PD) over the signal pairs of an Ethernet connection, and the generated power to the PD over the unused pairs of the Ethernet connection.

25 Claims, 14 Drawing Sheets

US 7,490,251 B2

METHOD AND APPARATUS FOR CURRENT SHARING ETHERNET POWER ACROSS FOUR CONDUCTOR PAIRS USING A MIDSPAN DEVICE

FIELD OF THE INVENTION

The present invention relates generally to networking equipment which is powered by and/or powers other networking equipment over wired data telecommunications network connections.

BACKGROUND OF THE INVENTION

Inline Power (also known as Power over Ethernet and PoE) is a technology for providing electrical power over a wired telecommunications network from power source equipment (PSE) to a powered device (PD) over a link section. The power may be injected by an endpoint PSE at one end of the link section or by a midspan PSE along a midspan of a link section that is distinctly separate from and between the medium dependent interfaces (MDIs) to which the ends of the link section are electrically and physically coupled.

PoE is defined in the IEEE (The Institute of Electrical and Electronics Engineers, Inc.) Standard Std 802.3af-2003 published 18 Jun. 2003 and entitled "IEEE Standard for Information technology—Telecommunications and information exchange between systems—Local and metropolitan area networks—Specific requirements: Part 3 Carrier Sense Multiple Access with Collision Detection (CSMA/CD) Access Method and Physical Layer Specifications: Amendment: Data Terminal Equipment (DTE) Power via Media Dependent Interface (MDI)" (herein referred to as the "IEEE 802.3af standard"). The IEEE 802.3af standard is a globally applicable standard for combining the transmission of Ethernet packets with the transmission of DC-based power over the same set of wires in a single Ethernet cable. It is contemplated that Inline Power will power such PDs as Internet Protocol (IP) telephones, surveillance cameras, switching and hub equipment for the telecommunications network, biomedical sensor equipment used for identification purposes, other biomedical equipment, radio frequency identification (RFID) card and tag readers, security card readers, various types of sensors and data acquisition equipment, fire and life-safety equipment in buildings, and the like. The power is direct current, 48 Volt power available at a range of power levels from roughly 0.5 watt to about 15.4 watts in accordance with the standard. There are mechanisms within the IEEE 802.3af standard to allocate a requested amount of power. Other proprietary schemes also exist to provide a finer and more sophisticated allocation of power than that provided by the IEEE 802.3af standard while still providing basic compliance with the standard. As the standard evolves, additional power may also become available. Conventional 8-conductor type RG-45 connectors (male or female, as appropriate) are typically used on both ends of all Ethernet connections. They are wired as defined in the IEEE 802.3af standard.

FIGS. 1A, 1B and 1C are electrical schematic diagrams of three different variants of PoE as contemplated by the IEEE 802.3af standard. In FIG. 1A a data telecommunications network 10a comprises a switch or hub 12a with integral power sourcing equipment (PSE) 14a. Power from the PSE 14a is injected on the two data carrying Ethernet twisted pairs 16aa and 16ab via center-tapped transformers 18aa and 18ab. Non-data carrying Ethernet twisted pairs 16ac and 16ad are unused in this variant. The power from data carrying Ethernet twisted pairs 16aa and 16ab is conducted from center-tapped transformers 20aa and 20ab to powered device (PD) 22a for use thereby as shown. In FIG. 1B a data telecommunications network 10b comprises a switch or hub 12b with integral power sourcing equipment (PSE) 14b. Power from the PSE 14b is injected on the two non-data carrying Ethernet twisted pairs 16bc and 16bd. Data carrying Ethernet twisted pairs 16ba and 16bb are unused in this variant for power transfer. The power from non-data carrying Ethernet twisted pairs 16bc and 16bd is conducted to powered device (PD) 22b for use thereby as shown. In FIG. 1C a data telecommunications network 10c comprises a switch or hub 12c without integral power sourcing equipment (PSE). Midspan power insertion equipment 24 simply passes the data signals on the two data carrying Ethernet twisted pairs 16ca-1 and 16cb-1 to corresponding data carrying Ethernet twisted pairs 16ca-2 and 16cb-2. Power from the PSE 14c located in the midspan power insertion equipment 24 is injected on the two non-data carrying Ethernet twisted pairs 16cc-2 and 16cd-2 as shown. The power from non-data carrying Ethernet twisted pairs 16cc-2 and 16cd-2 is conducted to powered device (PD) 22c for use thereby as shown. Note that powered end stations 26a, 26b and 26c are all the same so that they can achieve compatibility with each of the variants described above.

Turning now to FIGS. 1D and 1E, electrical schematic diagrams illustrate variants of the IEEE 802.3af standard in which 1000 BaseT communication is enabled over a four pair Ethernet cable. Inline Power may be supplied over two pair or four pair. In FIG. 1D the PD accepts power from a pair of diode bridge circuits such as full wave diode bridge rectifier type circuits well known to those of ordinary skill in the art. Power may come from either one or both of the diode bridge circuits, depending upon whether Inline Power is delivered over Pair 1-2, Pair 3-4 or Pair 1-2+Pair 3-4. In the circuit shown in FIG. 1E a PD associated with Pair 1-2 is powered by Inline Power over Pair 1-2 and a PD associated with Pair 3-4 is similarly powered. The approach used will depend upon the PD to be powered.

Inline Power is also available through techniques that are non-IEEE 802.3 standard compliant as is well known to those of ordinary skill in the art.

In order to provide regular Inline Power to a PD from a PSE it is a general requirement that two processes first be accomplished. First, a "discovery" process must be accomplished to verify that the candidate PD is, in fact, adapted to receive Inline Power. Second, a "classification" process must be accomplished to determine an amount of Inline Power to allocate to the PD, the PSE having a finite amount of Inline Power resources available for allocation to coupled PDs.

The discovery process looks for an "identity network" at the PD. The identity network is one or more electrical components which respond in certain predetermined ways when probed by a signal from the PSE. One of the simplest identity networks is a resistor coupled across the two pairs of common mode power/data conductors. The IEEE 802.3af standard calls for a 25,000 ohm resistor to be presented for discovery by the PD. The resistor may be present at all times or it may be switched into the circuit during the discovery process in response to discovery signals from the PSE.

The PSE applies some Inline Power (not "regular" Inline Power, i.e., reduced voltage and limited current) as the discovery signal to measure resistance across the two pairs of conductors to determine if the 25,000 ohm resistance is present. This is typically implemented as a first voltage for a first period of time and a second voltage for a second period of time, both voltages exceeding a maximum idle voltage (0-5 VDC in accordance with the IEEE 802.3af standard) which may be present on the pair of conductors during an "idle" time while regular Inline Power is not provided. The discovery signals do not enter a classification voltage range (typically about 15-20V in accordance with the IEEE 802.3af standard) but have a voltage between that range and the idle voltage range. The return currents responsive to application of the discovery signals are measured and a resistance across the two pairs of conductors is calculated. If that resistance is the identity network resistance, then the classification process may commence, otherwise the system returns to an idle condition.

In accordance with the IEEE 802.3af standard, the classification process involves applying a voltage in a classification range to the PD. The PD may use a current source to send a predetermined classification current signal back to the PSE. This classification current signal corresponds to the "class" of the PD. In the IEEE 802.3af standard as presently constituted, the classes are as set forth in Table I:

TABLE I

| Class | PSE Classification Current Range (mA) | Corresponding Inline Power Level (W) |
| --- | --- | --- |
| 0 | 0-5 | 15.4 |
| 1 | 8-13 | 4.0 |
| 2 | 16-21 | 7.0 |
| 3 | 25-31 | 15.4 |
| 4 | 35-45 | reserved |

The discovery process is therefore used in order to avoid providing Inline Power (at full voltage of −48 VDC) to so-called "legacy" devices which are not particularly adapted to receive or utilize Inline Power.

The classification process is therefore used in order to manage Inline Power resources so that available power resources can be efficiently allocated and utilized.

It may be desired to provide inline power down all four pairs in a cable. As mentioned above, the existing IEEE 802.3af standard specifies that a PD can draw approximately 12.95 W (@350 mA) down two pairs. However, if a PD requires more power, it may utilize all four pairs to draw approximately 12.95 W from each set of pairs. It is therefore desired to ensure that during such an operation, the PD does not draw more than 12.95 W (or 350 mA) from each set of pairs as a over-current condition can result in a loss of power.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

DETAILED DESCRIPTION

Embodiments of the present invention described in the following detailed description are directed at Ethernet power delivery. Those of ordinary skill in the art will realize that the detailed description is illustrative only and is not intended to restrict the scope of the claimed inventions in any way. Other embodiments of the present invention, beyond those embodiments described in the detailed description, will readily suggest themselves to those of ordinary skill in the art having the benefit of this disclosure. Reference will now be made in detail to implementations of the present invention as illustrated in the accompanying drawings. Where appropriate, the same reference indicators will be used throughout the drawings and the following detailed description to refer to the same or similar parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1A:
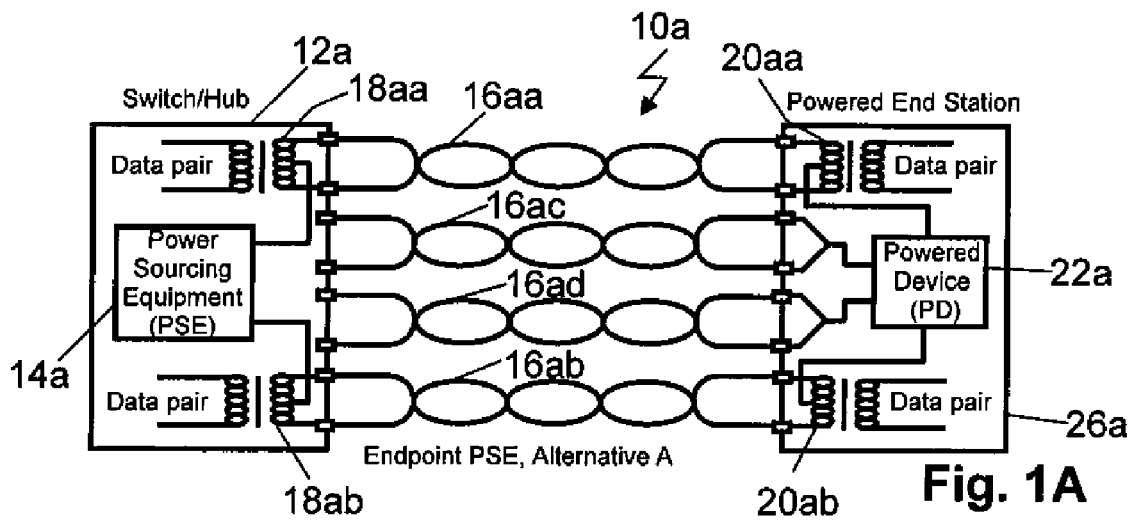
FIGS. 1A, 1B, 1C, 1D and 1E are electrical schematic diagrams of portions of data telecommunications networks in accordance with the prior art.
Figure 1B:
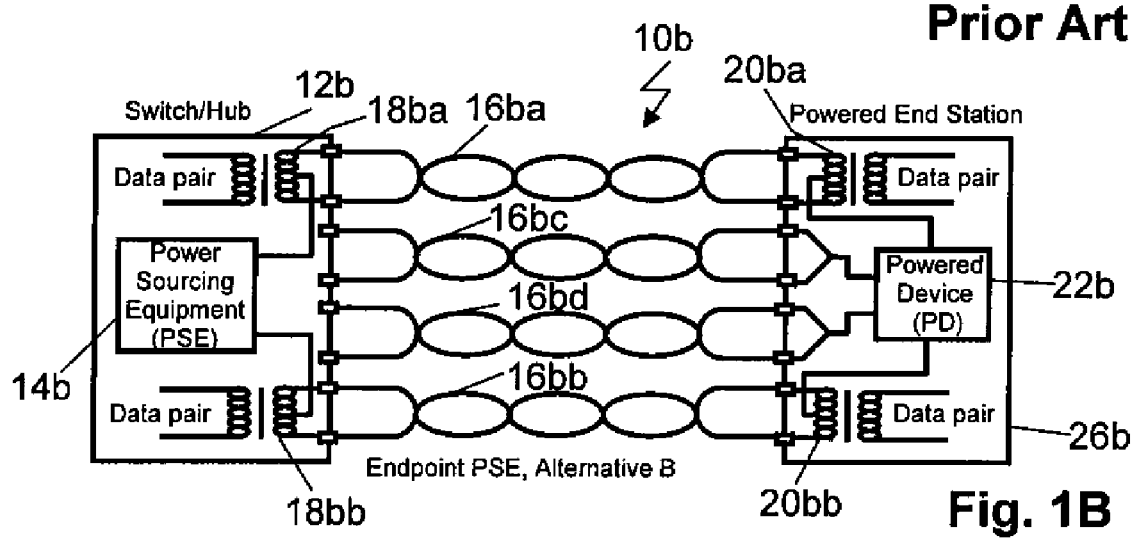
Figure 1C:
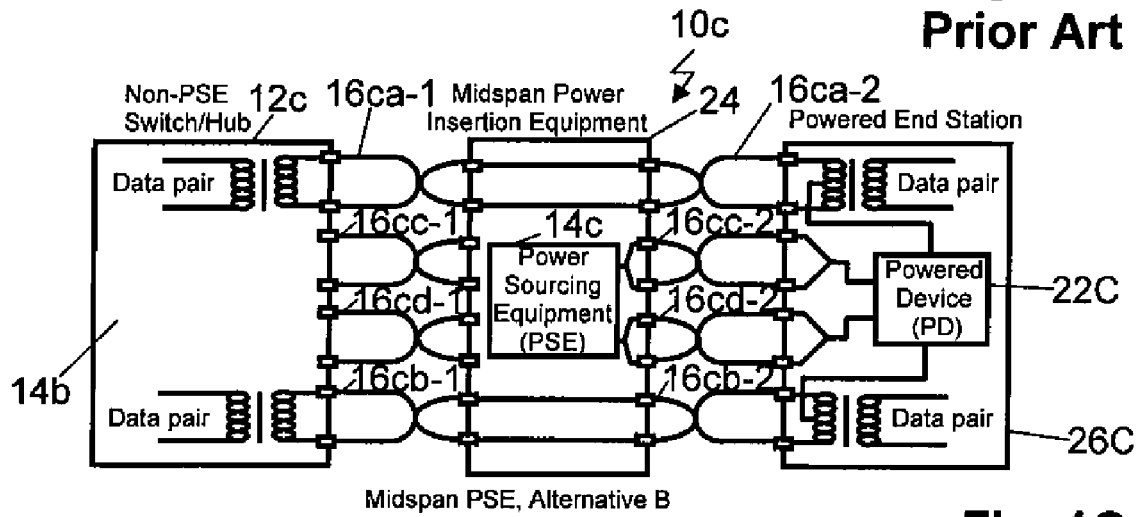
Figure 1D:
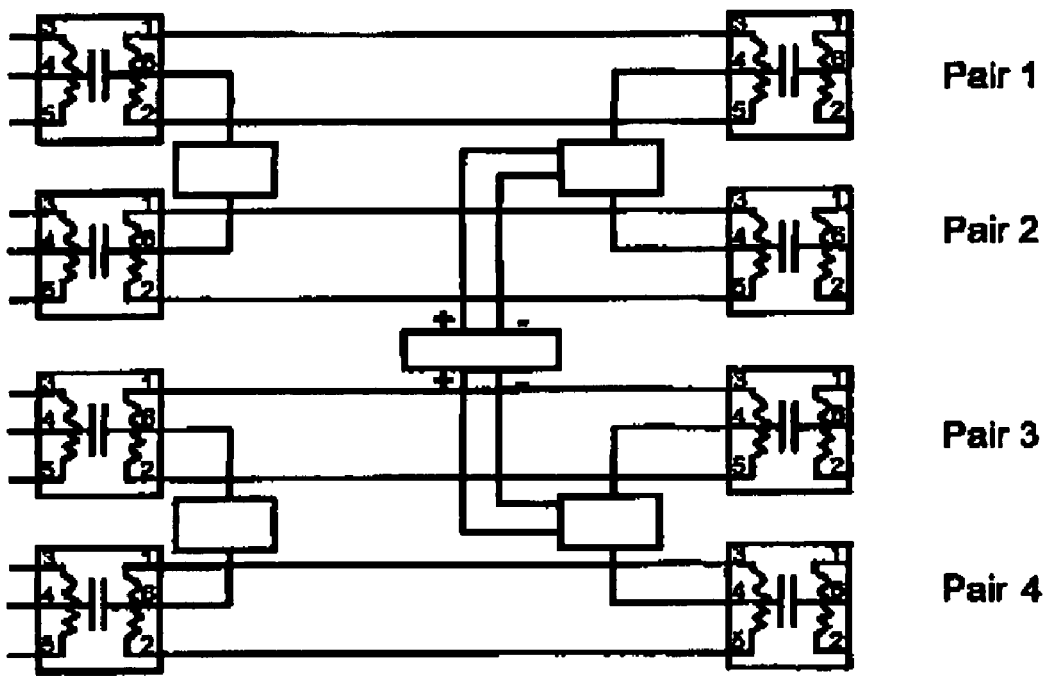
Figure 1E:
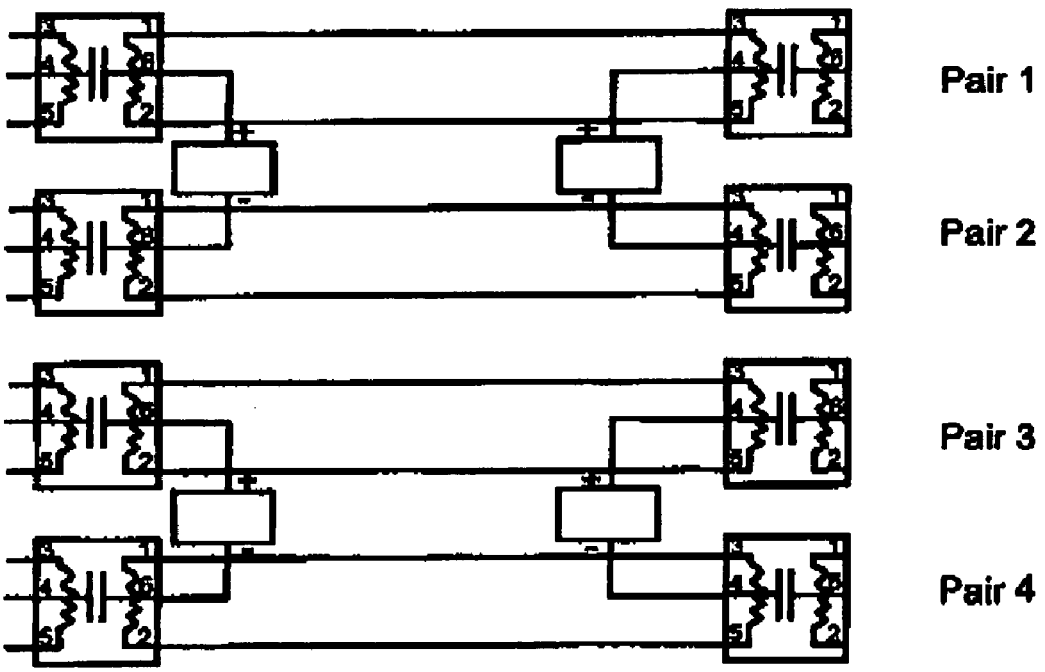
Figure 2:
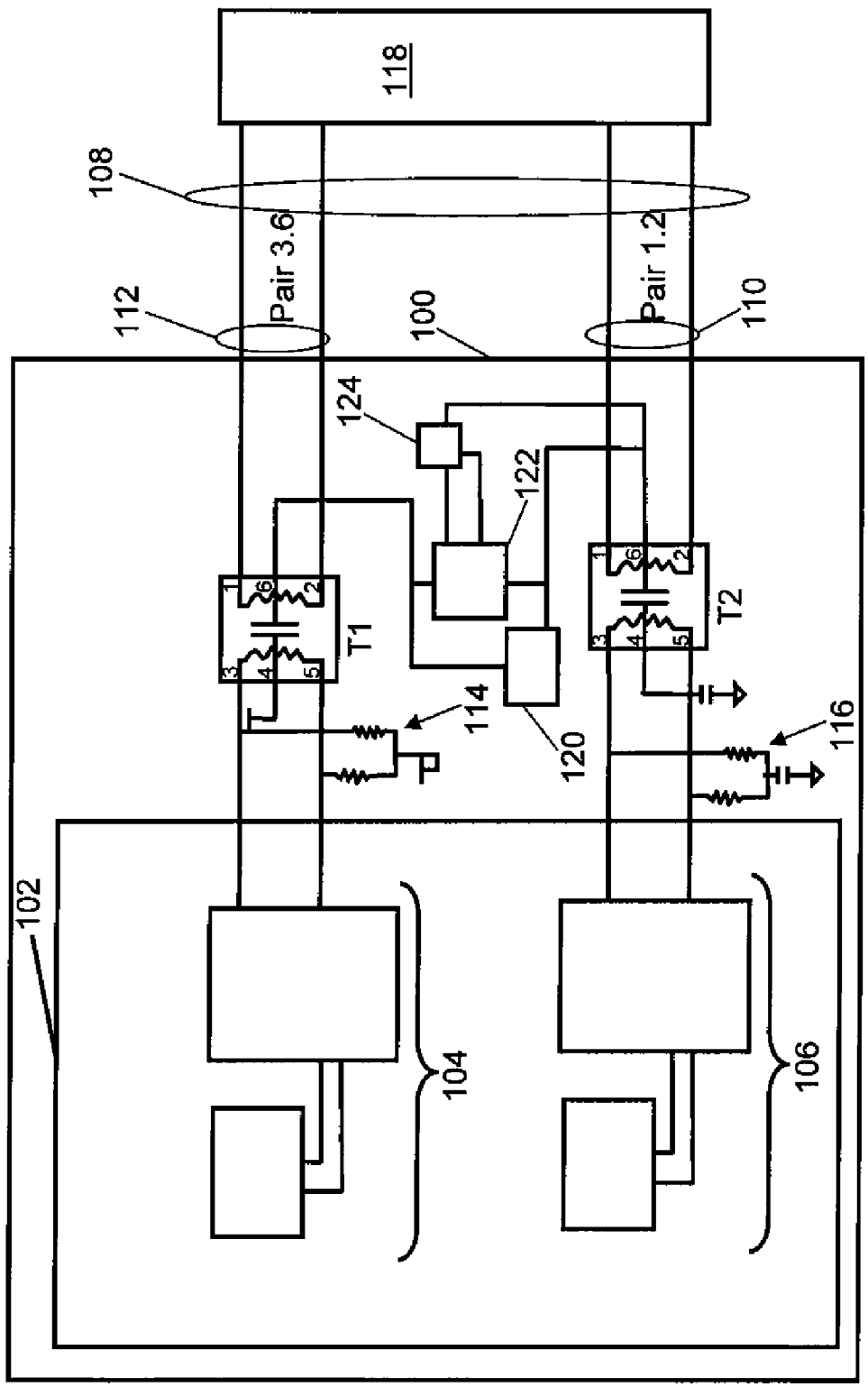
FIG. 2 is an electrical schematic diagram of a typical Ethernet 10/100 Base T connection in accordance with the prior art.

Turning now to FIG. 2 a typical 2-pair Ethernet (10 Base T, 100 Base T and 1000BT if 4-pairs were used) connection is illustrated. Box 100 encompasses the Ethernet port as it might exist in a network device such as a switch, hub, router or like device. Within port 100 is a PHY or physical layer device 102 which includes transmit circuitry 104 and receive circuitry 106. The transmit circuitry 104 interfaces to a connector such as an RJ-45 connector (not shown here) and through the connector to a cable 108 which includes at least two pairs of conductors, the Pair 1-2 (110) and the Pair 3-6 (112). The interface between the transmit circuitry 104 and the cable 108 includes a center-tapped magnetic device such as transformer T1. T1 has a PHY-side including pins 1 and 2 and center tap 6, and a wire side including pins 3 and 5 and center tap 4. The PHY side is also referred to as the primary side; the wire side is also referred to as the secondary side of the magnetic device T1. Termination circuitry 114 provides a Vdd bias (here illustrated as +3.3 VDC) to the primary of T1. The secondary of T1 is coupled to cable pair 112 which is, in turn, coupled in operation to a network device 118 which may be another hub, switch or router or a PD such as a Voice Over Internet Protocol (VoIP) telephone or other network device.

The interface between the receive circuitry 106 and the cable 108 includes a center-tapped magnetic device such as transformer T2. T2 has a PHY-side including pins 1 and 2 and center tap 6, and a wire side including pins 3 and 5 and center tap 4. The PHY side is also referred to as the primary side; the wire side is also referred to as the secondary side of the magnetic device T2. Termination circuitry 116 provides a ground bias to the primary of T2. The secondary of T2 is coupled to cable pair 110 which is, in turn, coupled in operation to a network device 118. If the pairs of conductors shown belonged to a 1000 Base T wired data telecommunications network segment then each pair would transmit and receive at the same time and all four pairs in the cable would be used.

Center tap pins 4 of T1 and T2 are coupled to inline power circuitry including a 48 VDC power supply 120 for providing Inline Power over cable 108, control circuitry 122 and switch circuitry 124.

Figure 3:
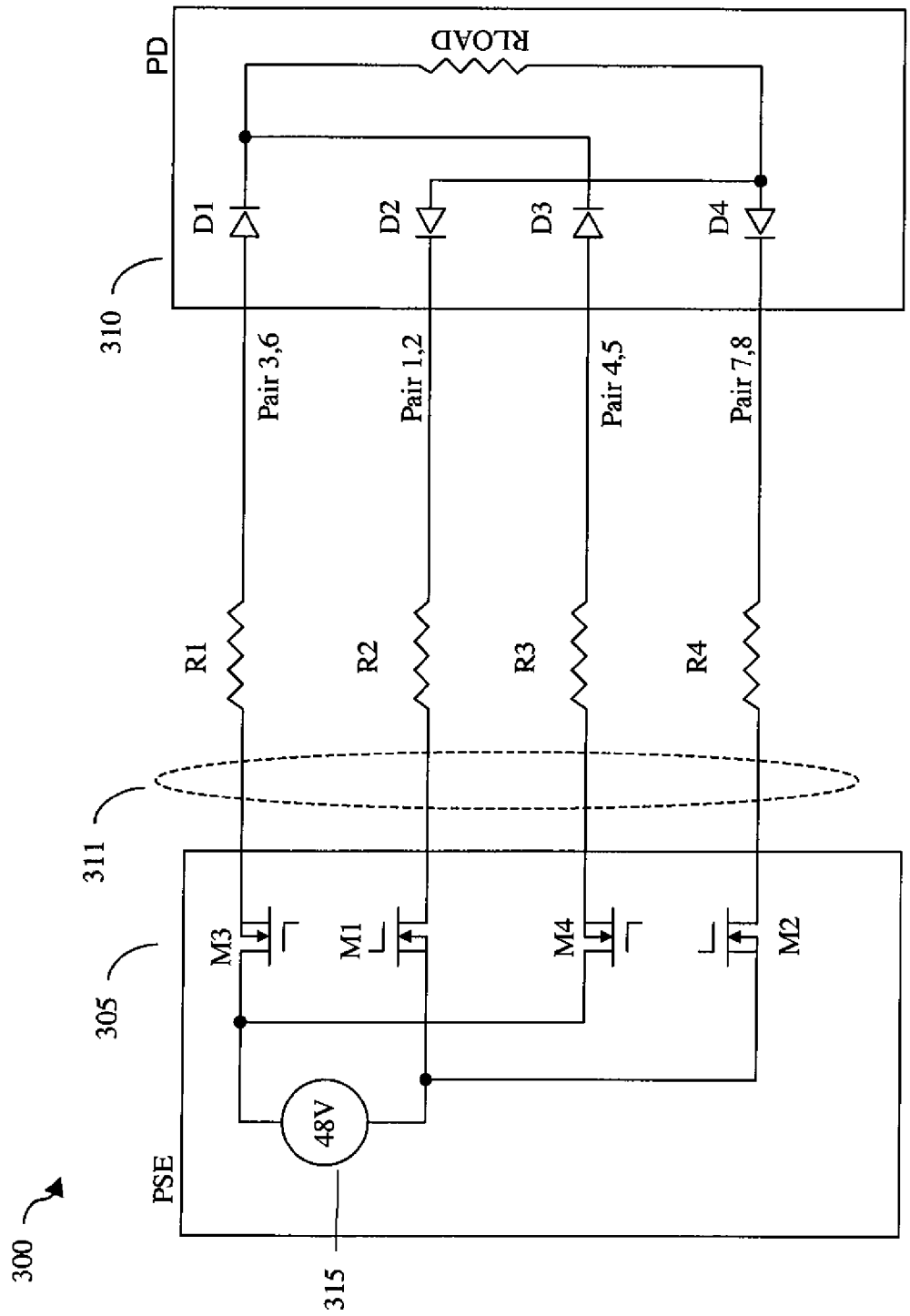
FIG. 3 is a circuit diagram of an Ethernet system in which power is being delivered down all four pairs of the Ethernet cable.

FIG. 3 is a schematic diagram of an Ethernet system 300 configured to deliver power down four conductor pairs without current balancing. FIG. 3 shows a PSE 305 coupled to a PD 310 using all four conductor pairs of an Ethernet cable 311. Typically, power is not delivered down the unused pairs 4,5 and 7,8. However, in FIG. 3, pair 4,5 is coupled to pair 3,6, and pair 7,8 is coupled to pair 1,2. Thus, the pairs formed by conductors 3,6 and 4,5 are coupled from the positive side of 48V power source for PSE 305 to the PD 310 through diodes D1 and D3. The pairs formed by conductors 1,2 and 7,8 are coupled from the negative side of power source 315 of PSE 305 to the PD 310 through diodes D2 and D4.

To switch power to all four pairs, the PSE 305 includes power switches M1-M4 disposed inline with the conductor pairs. Power switches M1 and M2 are configured to close the path formed by the power source 315, the conductor pairs 1,2 and 7,8, and load of the PD 310 (shown as a load resistance RLOAD). Likewise, power switches M3 and M4 are configured to close the return path formed by the power source 315, the conductor pairs 3,6 and 4,5, and RLOAD. The effective resistance of the total path from the power source to the PD load, including that wires forming the cable 311, is shown as R1-R4 for pairs 3,6; 1,2; 4,5; and 7,8, respectively.

The result of coupling conductor pairs as shown in FIG. 3 is that the conductor pairs are electrically connected as parallel resistors, i.e., R1 and R3, and R2 and R4, each respectively form a circuit of parallel resistors.

As is appreciated by those skilled in the art, the IEEE 802.3af standard specifies a maximum 350 mA current level down powered conductor pairs. However, a small imbalance in the effective total path resistance consistent of intrinsic cable resistance, resistance of connectors, resistance of coupling windings of magnetics and the likes of one or more pairs can cause a shift in the voltage drop across the effective resistance of such pairs that would lead to mismatch in the current delivered down each pair. Ideally for a specific load, such current must be equal in all pairs. As can be seen from FIG. 3, because of the diode coupling used in the IEEE spec, a small change in the effective total path resistance of two or more pairs can therefore result in a proportional change in the magnitude of current delivered down each pair. Changes in the total effective path resistance through a conductor pair may be caused by a wide variety of factors, such as tolerances in conductor windings and connector couplings of the conductors, as well as tolerance swings in other components, such as coupling transformers typically used in Ethernet ports.

According to the IEEE 802.3af specification today, the PSE can shut down a port when the current is in the range of 350-400 ma. Hence, when providing power down all four pairs, it is desired that the PSE port doesn't shut down because it is fooled into seeing a short circuit condition when in fact the current level exceeding the 350 ma threshold is a result of the mismatch of the effective DCR (Direct Current resistance) of the total path.

Thus, a small imbalance of resistance between R1 and R3, or between R2 and R4, may result in the magnitude of current down each pairs to be mismatched. If the imbalance is large enough, the current down one pair may exceed the 350-400 mA threshold (typically designed around 375 mA) limit, and the system i.e., the PSE, may mistakenly detect a short circuit condition and shut down the device, when in reality the DCR mismatch causes the fault to appear due to effective resistance mismatch.

The present disclosure ensures that the current down any pair does not exceed a cutoff threshold, such as 350 mA, which is used as a soft limit to trigger actions that give the PSE or the PD a chance to initiate a corrective action to such an overcurrent condition pending the evaluation of whether it is a short, or a mismatch. While the 350 ma soft limit may be deployed in both the PSE and the PD, the PSE has the option of using the same threshold typically midway between the 350 ma and the 400 ma limit as a trigger instead of adding a new 350 mA threshold. The present disclosure provides for methods and apparatus for monitoring the system voltage and current levels, either at the PSE or the PD, and responsive to the monitoring, modulating the gate voltage of power FET switches thereby increasing their ON-resistance to maintain a desired current level. Integrated circuits already present in a typical Ethernet device may be utilized to monitor the voltage and/or current levels in a pair. If conditions are detected that are out of range, the control circuitry will decrease the bias voltage applied to the gate of the power FET, causing the FET to conduct less current, limiting the current in the process. This will force a portion of the drawn current to flow down the other pair, thereby balancing the current flow between the conductor pairs. Such balancing does not necessitate the current in all pairs to be equal in magnitude, rather, the goal is to insure that neither hot-swap engine (circuitry known in the art for power management, i.e., detecting shorts on each sets of pairs) present on pairs 1,2 and 3,6 or pairs 4,5 and 7,8 is fooled into shutting the power down due to the effective resistance mismatch.

The present disclosure provides for a sense of such a mismatch, and provides a solution by sensing the current at a threshold below the 350 mA to serve as a warning to a correcting loop inside the PSE or PD. Thus, the present disclosure allows for a current sense to make sure that prior to the activation of the short circuit threshold, in the range of 350-400 ma, conditions are detected that indicate that the current is going towards the short circuit threshold to initiate an attempt at keeping the power on if such a condition is due to a mismatch. If the condition is caused by an imbalance of DCR, the current may be balanced ahead of such a short-circuit indication. Thus, the goal of this disclosure is keeping the power up while under a mismatch condition up to certain reasonable limit, but if the mismatch is very high, then a failure may exist, such as a broken wire, and power will need to be shut down.

The current sense of this disclosure takes place on each set of pairs independent of the other. Embodiments of this disclosure modulate the gate of the power switches to limit the current in one pair, enabling the other pair to conduct more of the current. Thus, the present disclosure effectively forces a limited mismatch in current so as to not cause an overcurrent or a shutoff condition. This is done while monitoring for true overcurrent conditions, such as short circuits, in parallel.

Figure 4:
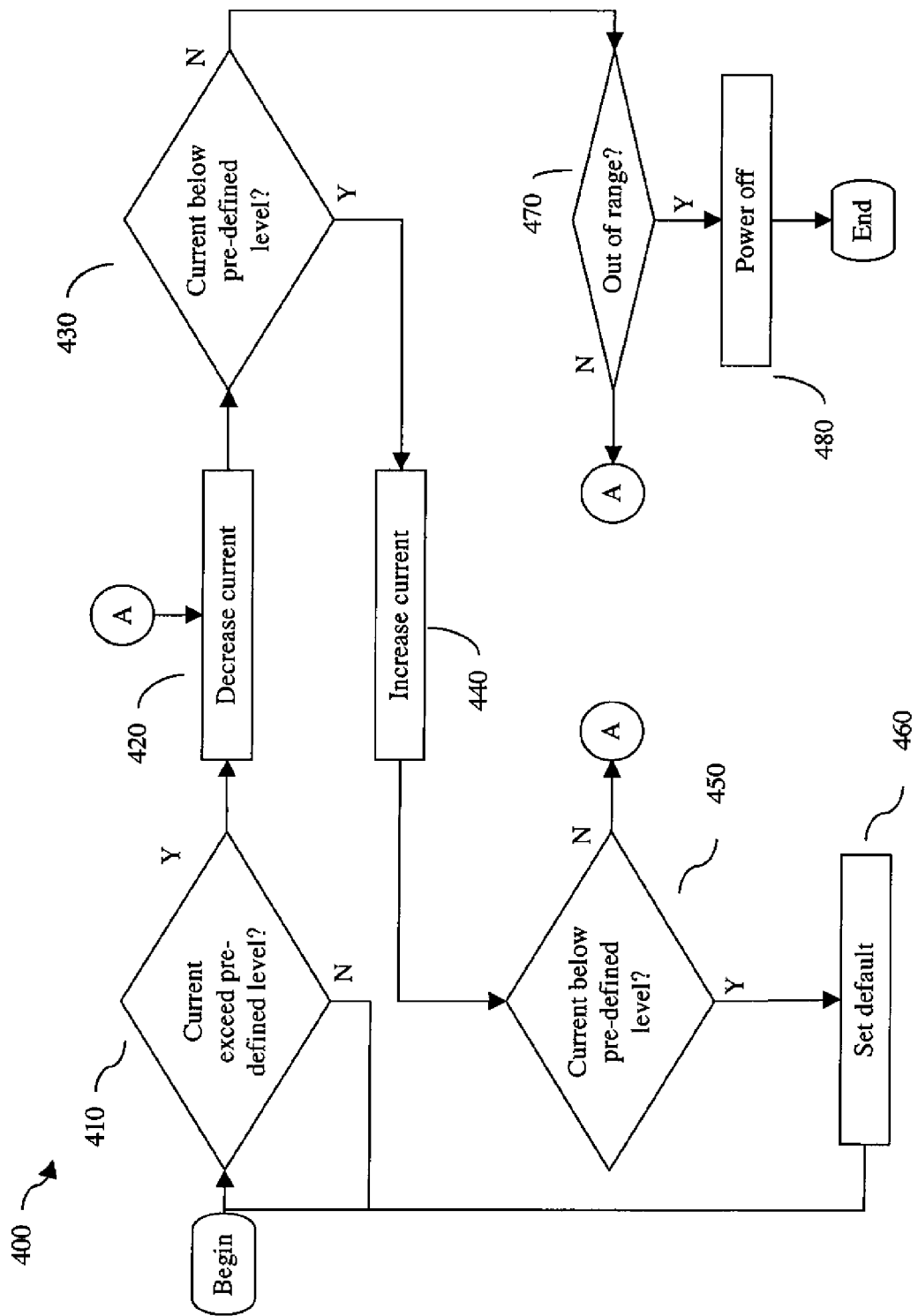
FIG. 4 is a flow diagram of a method for monitoring current in a conductor in accordance with the teachings of this disclosure.

FIG. 4 is a flow diagram of a method for monitoring current in accordance with the teachings of this disclosure. The process 400 begins in query 410, where it is determined whether the current in one conductor pair has exceeded a predetermined level. The process of query 410 may loop until a condition is detected in which the current level exceeds a pre-determined level. In preferred embodiments, a level of 350 mA is chosen as a threshold level, though other levels may be chosen based on particular applications.

If it is determined that the current exceeds a predetermined level, then the process moves to act 420, where the current is decreased in the conductor. The process then moves to query 430, where it is determined whether the current has fallen below a predetermined level. If the current has fallen below a predetermined level, then the process moves to act 440, where the current level is increased.

The process then moves to query 450, where the current level is again sensed to determine whether the current level is below a predetermined level. If the current is still below a predetermined level, then the process loops back to query 410 after setting the current to a default level in act 460. If the current level is not below a predetermined level in query 450, then the process loops back to act 420, where the current is decreased. As will be appreciated, the process of FIG. 4 reacts in a fold-back manner if the current is aggressively exceeding the over-current threshold. If the current is hovering around the 350 mA limit, it will soft limit at 350 ma due to the loop corrective action—the process is the same. By alternatively lowering and raising the current level in steps in an attempt to adjust the current level to fall within a desired range the PSE or the PD can provide the means to keep the power on.

In the event of a fault such as a short circuit, the disclosed system may be unable to lower the current to within a range that allows the power to be kept on. Such a case will be detected in query 430, where the current has not fallen below a predetermined level even the attempt to lower the current in act 420. In such a case, the process will move to query 470, where the current is sensed to determined whether it is out of a predetermined range. If the current level is out of range, then the system is powered off in act 480, and the process ends. If the current has been determined to be in range in query 470, then the process loops back to act 420, where the current is lowered again.

Figure 5:
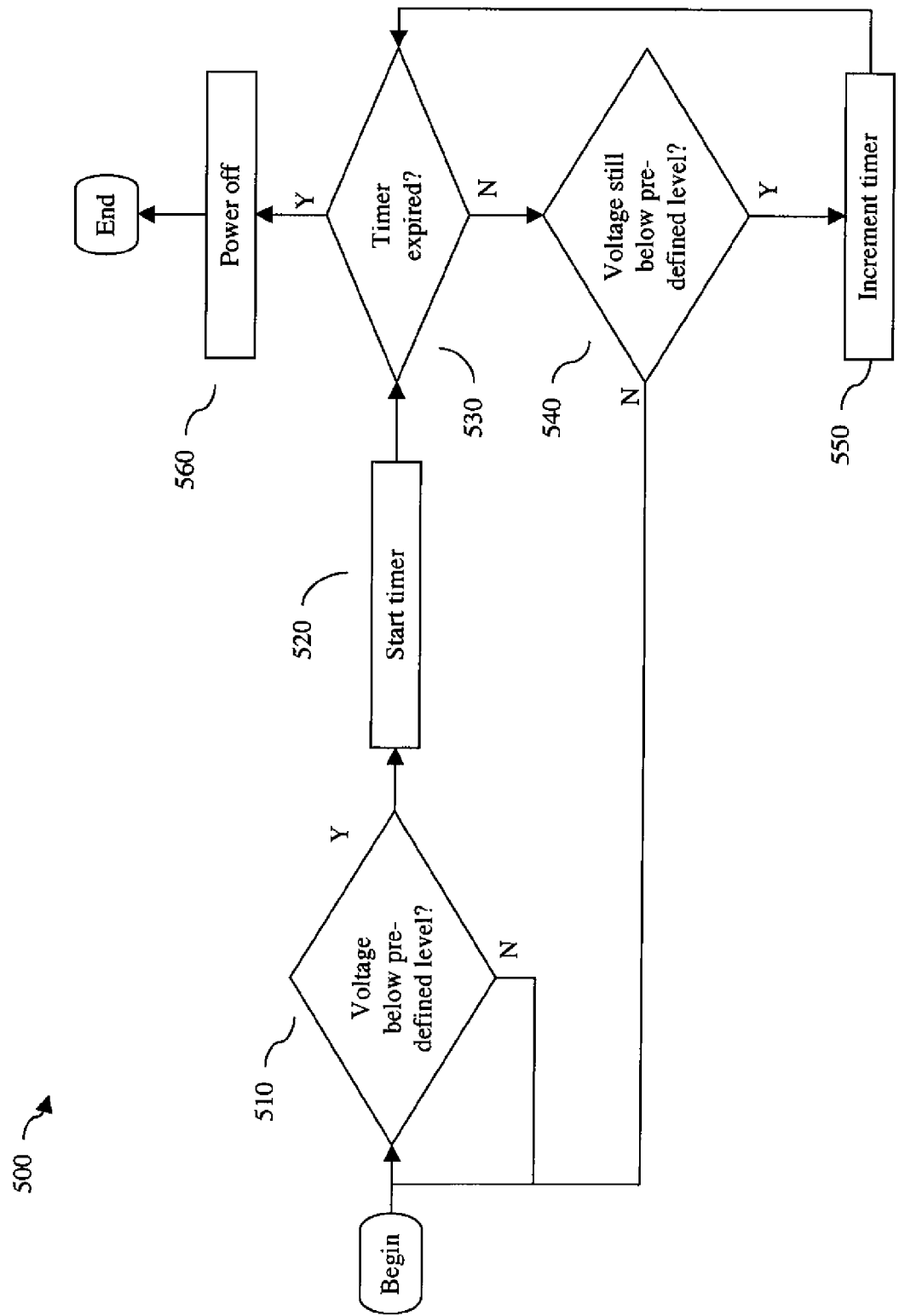
FIG. 5 is a flow diagram of a method for monitoring voltage in an Ethernet system in accordance with the teachings of this disclosure.

To further provide for a fail-safe short circuit protection, the voltage across the port may also be sensed. FIG. 5 is a flow diagram of a method 500 for determining whether a short circuit condition exists in an Ethernet system. The process begins in query 510, where the process waits for a detection of a voltage level exceeding a predefined level. If such a detection has been made, the process moves to act 520, where a timer is then set. The process then enters the loop defined by acts 530-550, where the voltage is continued to be sensed until either the timer expires or the voltage is sensed below the predefined value. If the voltage is found to be below the predefined level in query 530 before the timer expires, the process then moves back to query 510.

If the voltage remains above the predefined level, the timer will be incremented in act 550. If the voltage level remains above the predefined level when the timer expires in query 530, then the port will be powered off in act 560.

Embodiments of circuitry for the above described methods will now be disclosed.

Figure 6:
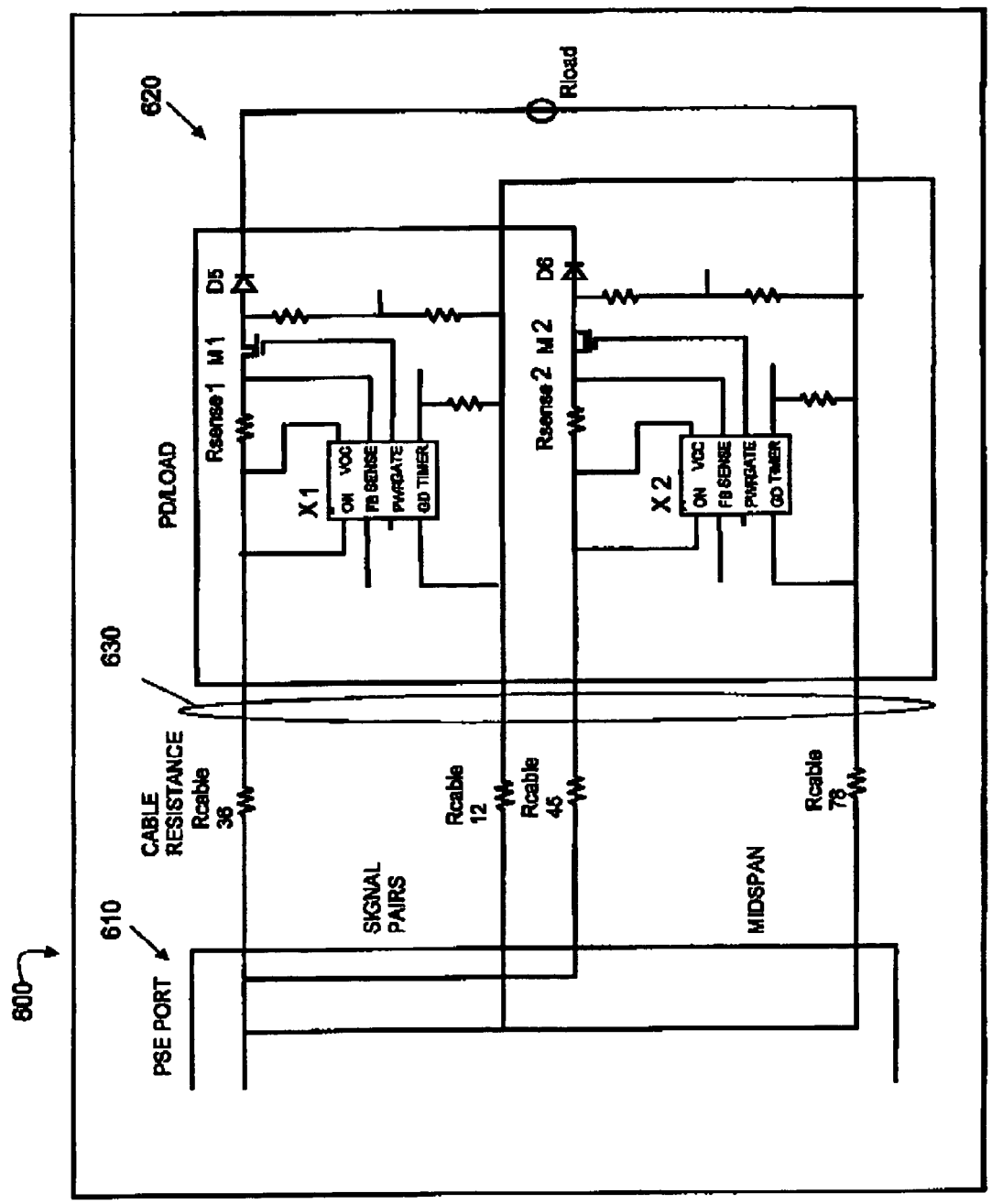
FIG. 6 is a circuit diagram of a system for balancing current delivered down four conductor pairs between Ethernet devices in accordance with the teachings of this disclosure.

FIG. 6 is a circuit diagram of a system 600 for balancing current delivered down four conductor pairs between Ethernet devices. The embodiment of FIG. 6 shows an example where the current balancing is performed in the PD. For simplicity, common circuitry such as diode bridges have been eliminated, and the implementation for one rail for each sets of pairs is shown, i.e., MOSFETs M1 and M2 present on pairs 3,6 and 4,5 show only half the supporting circuitry needed, the same circuitry would be used for pairs 1,2 and 7,8. FIG. 6 shows a PSE 610 coupled to a single PD 620 through an Ethernet cable 630. The effective path resistance including the intrinsic resistance of the cable 630 has been shown as a single resistance representing the combined resistances for each conductor pair and all components inline with the power signal. Thus, FIG. 6 shows the cable 630 as comprising Rcable 36, Rcable 12, Rcable45, and Rcable 78.

In a typical PD port, control circuitry is provided in the form of a hot-swap controller that is used to sense overcurrents. In FIG. 6, a pair of controllers X1 and X2 is provided. The overcurrent sensing is done by the controller chip by measuring the voltage across a sense resistor (Rsense 1 and Rsense2). If there is an overcurrent, the voltage across the sense resistor will be too high, and the controller chip will decrease the gate-to-source voltage of a FET coupled is in series with the sense resistor. FIG. 6 shows FETs M1 and M2 coupled inline with Rsense1 and Rsense2, respectively.

By controlling the gate voltage, the controller chip can limit the current to a predetermined value. When in current limit, the FET is held in the linear region, such that it acts like a variable resistor. When Vgs (gate to source voltage of the FET) decreases, the resistance of the FET increases, thus limiting the amount of current, thereby acting like a constant current source.

In preferred embodiments, the controllers X1 and X2 may comprise an LT1641 IC. from Linear Technology or a functional equivalent. A datasheet may be found at: http://www-.lineartech.com/pc/downloadDocument.do?navId=H0,C3, P1781,D1566.

As can be seen from FIG. 6, the controllers X1 and X2 are coupled between their respective send and return pairs. Thus, X1 is coupled between pair 3,6 and 1,2, and X2 is coupled between pair 4,5 and 7,8. A sense input SENSE of each controller is coupled to sense the voltage across its respective FET and a pair of series resistors. A gate controller output GATE is coupled to the gate the controller's respective FET. The outputs of the FETs are then diode or-ed to the PD load RLOAD through the use of additional diodes D5 and D6.

In a typical operation, a capacitor is coupled from the TIMER output to ground. When an over-current situation is detected, a voltage is applied to charge the capacitor to initiate a timer-based current limit routine. When the voltage across the capacitor reaches a predefined level, the port is shut down. For example, if the LT1641 senses an overcurrent, the TIMER pin will source 80 uA of current. The normal operation of this pin is to charge the capacitor, such that when the voltage reaches 1.233V, the output will be shut off.

In a preferred embodiment, the controller setup is modified to provide a controller that has the ability to be placed in a current limit state indefinitely. By doing so, the controller chip may remain in a current limit state such that if one pair is in current limit, the controller chip for the other pair can react and balance the current without the first chip shutting down. In this disclosure, the TIMER cap was replaced with a 10 k resistor, so that the controller chip would not shut down its output if there is an overcurrent. By using a 10 k resistor instead of a capacitor, we can use this pin as an indication if the controller chip is in current limit or not. If the voltage is 0.8V (80 uA*10 k), the chip is in current limit. If the voltage is 0V, the chip is not in current limit. Thus, through the use of the diodes D5 and D6 of FIG. 6 for example, the controller chip for the other pair can react and balance the current without the first chip shutting down. The second pair increases its delivered current to keep the power up because one of the controllers behaves as a current source under this condition, i.e., the controller with an active current limit behaves as a current source, thus forcing the voltage at the FET to decrease and the excess current to flow on the other pair.

In preferred embodiments, the controller chips are configured to perform current limiting according to the method of FIG. 4 to comply with the limits as set forth in the IEEE 802.3af specification, or approximately 350-400 mA. It is contemplated that any hot-swap controller chip that has an external timer, or that may have the time routine modified in accordance with this disclosure, may be employed in the present disclosure. Such circuitry may reside on a single IC, possibly with integrated FET switches, and will support the same action on all 4-pairs as needed.

FIG. 6 shows that the current sense of this disclosure takes place on each sets of pairs independent of the other, that is, controller chip X1 operates on pairs 3,6 and 1,2, and controller chip X2 operates on pairs 4,5 and 7,8. The controller chips are configured to each operate independently in a current limit state to modulate the gate of the power FETs limit the current in one pair, while allowing the other pair to draw more of the current. Thus, the present disclosure effectively forces a pair conducting less current than the current-limited pair to draw more current, thus achieving a forced current balance between the pairs.

Thus, the system of FIG. 6 may be described as a four-pair power delivery system for Ethernet applications, where the current flow in each pair is dynamically monitored and adjusted so as to prevent over-current situations caused by differences in the electrical characteristics of the conducting paths. The dynamic monitoring may be performed by circuitry already present that has been modified from its original state with the addition of relatively few components.

Figure 7:
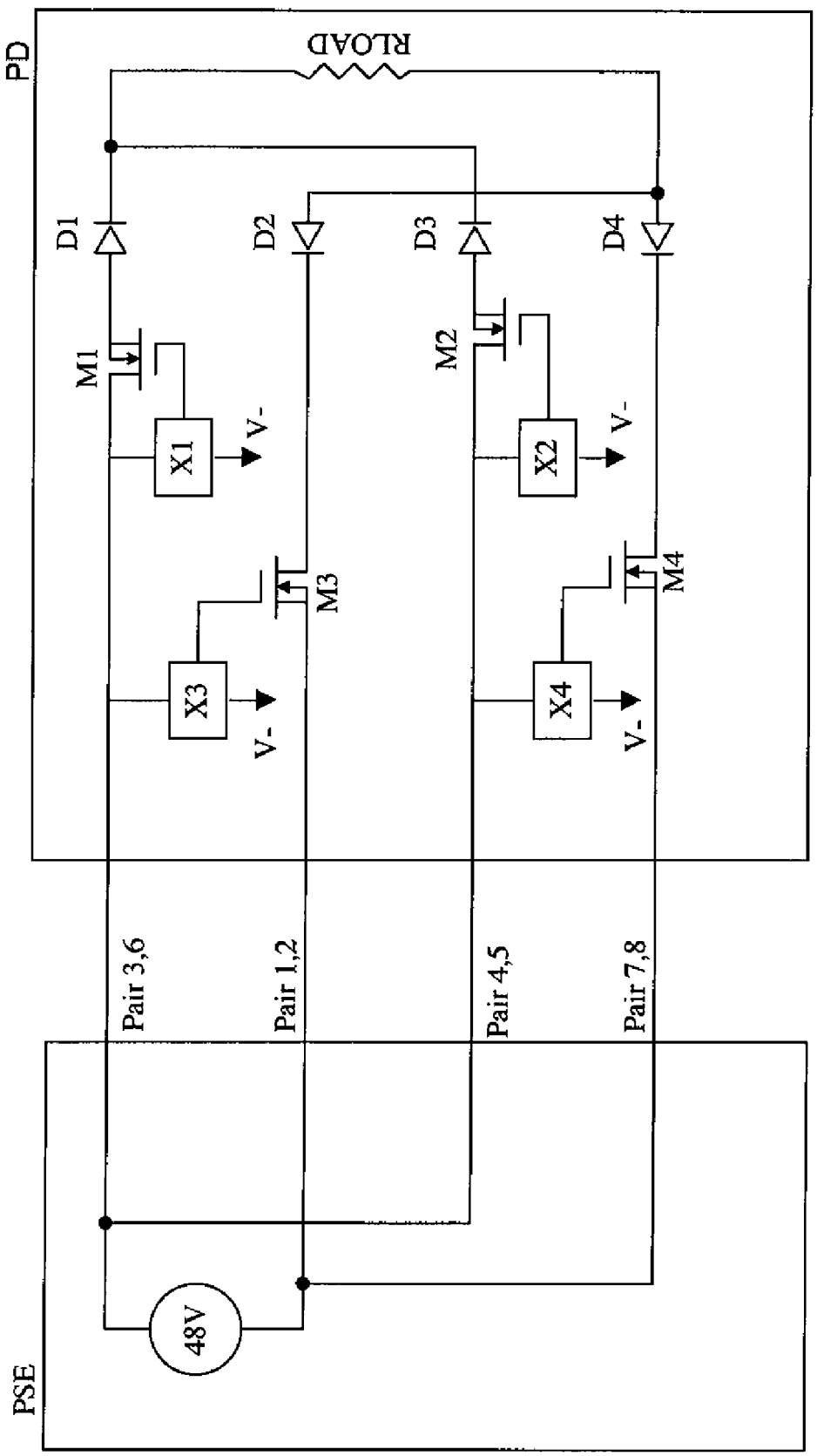
FIG. 7 is a circuit diagram of a fully implemented system implemented in the PD for balancing current delivered down four conductor pairs between Ethernet devices in accordance with the teachings of this disclosure.

FIG. 7 is a circuit diagram of a full implementation with current limiting provided on the negative side as well. As currently specified, the IEEE specification does not mandate where the current limit needs to be in the PSE port. Thus, the switch may have protection residing in the either the positive or negative leg, or both. FIG. 7 thus provides protection in both legs (positive and negative) in the PD so that the PSE port is not mistakenly tripped.

FIG. 7 shows controllers X1 and X2 coupled to pairs 3,6 and 4,5, respectively, as described above, and are shown as being coupled to V-, which is the negative side of the 48V power supply. Particular circuit details have been omitted for clarity. Controllers X3 and X4 have been provided to control the FETs M3 and M4 that are inline on pairs 1,2 and 7,8, respectively.

The controllers X3 and X4 preferably comprise negative hot-swap controllers, such as the LT4252A, also available from Linear Technologies. M3 and M4 comprise the n-channel FETs that the controller chips control in case of an overcurrent. As mentioned above in relation to the positive controllers X1 and X2, it is preferred that the chips be placed in a current limit state indefinitely. It is contemplated that the negative hot-swap controllers by adding conventional circuitry to the TIMER pin. This circuitry is preferably configured to keep the TIMER pin in a state such that the chip stays in a current limit state indefinitely.

The current limits of the LT4252A are 483 mA typical, with a sense resistor value of 0.124 ohm (Rsense3 and Rsense4). This threshold can be scaled down to below 350 mA by choosing suitable values, thus placing the controller chips in a current limit state well before a shut down condition.

Figure 8:
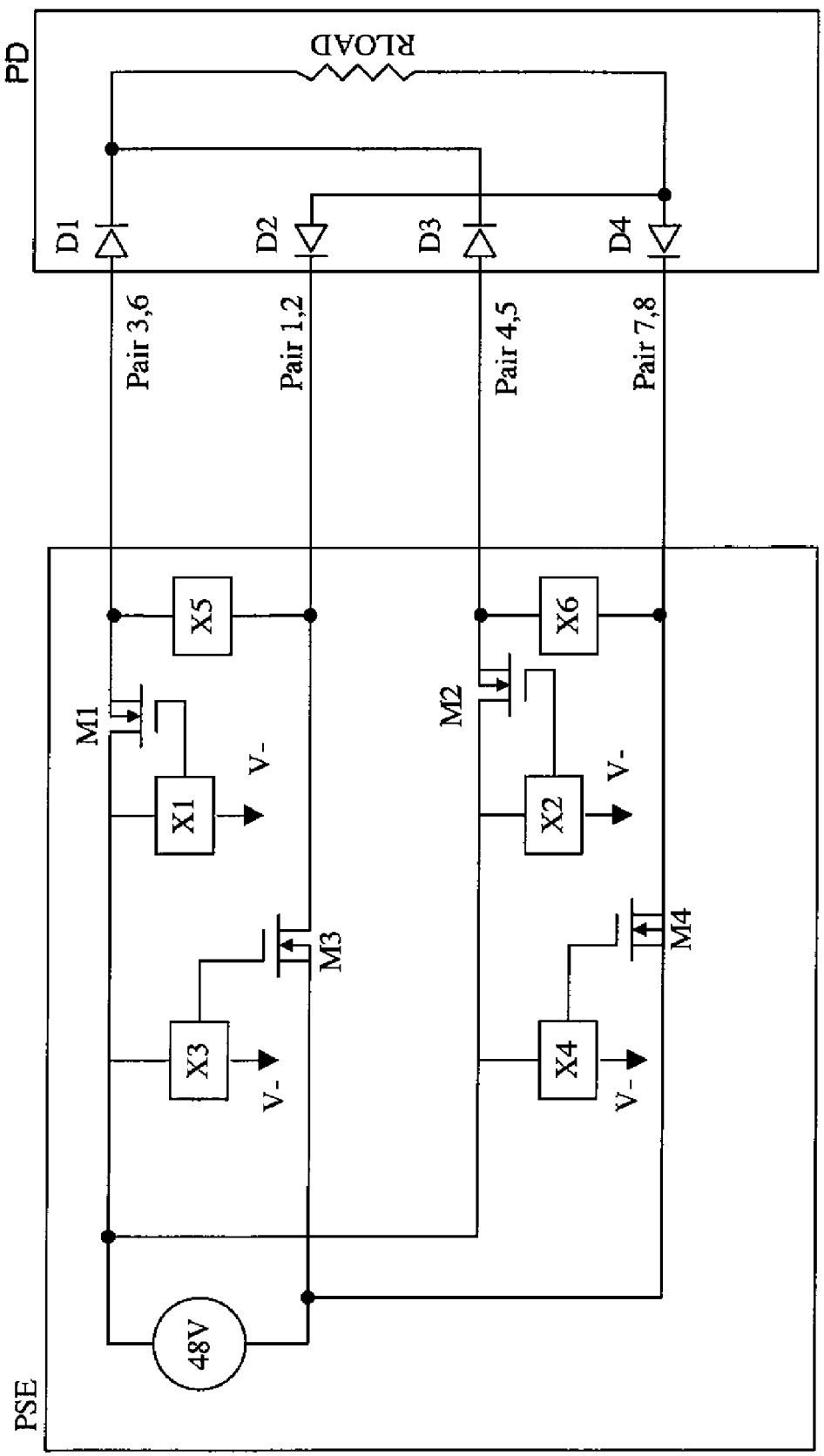
FIG. 8 is a circuit diagram of a system implemented in the PSE for balancing current delivered down four conductor pairs between Ethernet devices in accordance with the teachings of this disclosure.

Embodiments of this disclosure may also be implemented in the PSE. FIG. 8 is a diagram of such an implementation. The structure is similar to that as described in FIG. 7, expect that the controller chips and control FETs are now disposed in the PSE.

However, if the PSE is configured to perform the current limiting of this disclosure, the PSE must also be able to sense and shut the port down if there is a short circuit condition, as mandated by the current IEEE802.3af specification.

In a preferred embodiment, the PSE is configured to monitor the output voltage of each set of pairs determine if there is a short circuit. FIG. 8 includes voltage control circuitry X5 and X6 for monitoring the overall output voltage of the power supply on each conductor pair set. The circuitry X5 and X6 are preferably coupled in parallel with the voltage source to sense the overall system voltage level.

It is contemplated that the voltage control circuitry of X5 and X6 may be comprised of conventional circuitry for determining whether the voltage has fallen below a predetermined level. It is further contemplated that the control circuitry X5 may be configured to perform the method of FIG. 5 wherein if the output voltage falls below 30V for the timer period, then the PSE knows there is a short circuit condition and may shut down the port. Under normal operating conditions and with a 5.1 ohm imbalance, the output PSE port should never see a voltage less than 30V.

Additionally, the PSE may include fault bits associated with each pair set that may be set by the voltage control circuitry X5. If the PSE senses that fault bit have been set for both pairs, then the PSE may then shut off power to both powered pairs of the port.

Figure 9:
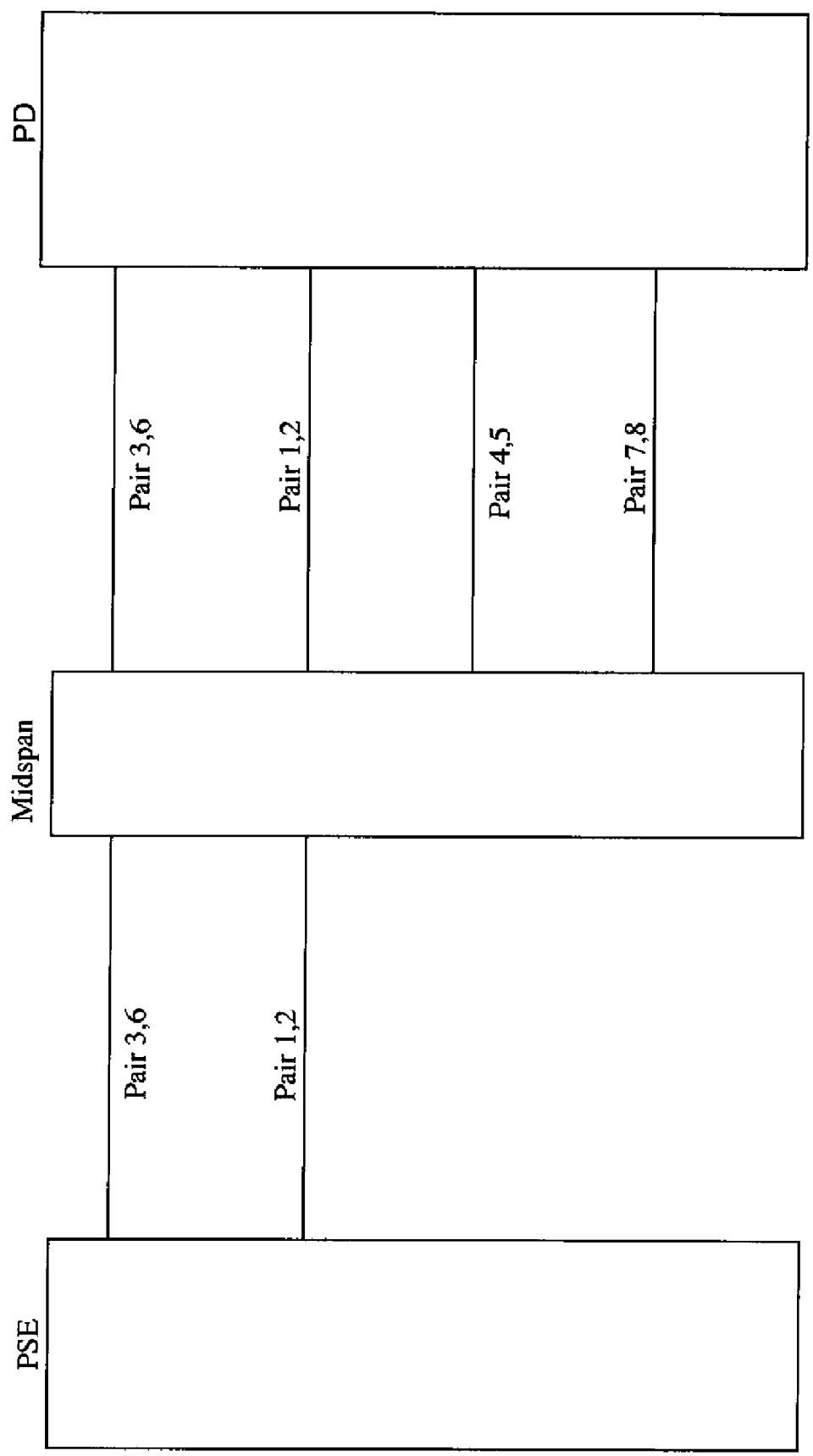
FIG. 9 is a conceptual schematic diagram of a system implemented in a midspan device for delivering current down four conductor pairs to a PD in accordance with the teachings of this disclosure.

The benefits of this disclosure may also be applied to a midspan device. FIG. 9 shows a block diagram of a PSE providing 15.4 W on the Ethernet pairs and a Midspan device providing 15.4 W on the unused pairs.

A midspan device is typically inserted between the switch port and a device such as an IP phone. The switch port may send 15.4 W on its used pairs (wires 3,6 and 1,2), as is typical. The midspan device passes the used pairs straight through with 15.4 W from the switch. However, using the circuitry of this disclosure, the midspan device may also put an additional 15.4 W on the midspan pairs (wires 4,5 and 7,8). Thus, the PD is supplied with 15.4 W from the switch port and 15.4 W from the midspan port.

However, it is contemplated that the voltage supplied by the PSE may vary from device to device. Any difference between the PSE voltage and the voltage supplied by the midspan device will exacerbate the problems described earlier. The circuitry disclosed thus far will attempt to cure the problem in the manner related above, potentially resulting in excess power dissipation.

To further complicate the problem, it will be appreciated that the total DC resistance of pairs 3,6 and 1,2 are different from pairs 4,5 and 7,8, because of the extra cable length needed between the PSE and the midspan device. This causes an even greater imbalance of resistance, and therefore a greater imbalance of current which could shut down a port sooner.

To ensure that the voltage applied to all pairs of the PD is substantially equal, the present disclosure provides circuitry for measuring the voltage as received from the PSE, and adjusting the output voltage of the midspan device to match the voltage of the PSE. According to the current IEEE 802.3af specification, the output port voltage can range from 44V to 57V. Taking the extreme case for example, the PSE output voltage could as low as 44V, and the midspan output voltage could be as high as 57V. Therefore, it is desired that the midspan output voltage dynamically track the output voltage of the PSE across all possible ranges.

Thus, the difference in output port voltage of the signal and unused pairs of the midspan device may be equalized by having the midspan monitor the voltage applied on the signal pairs. The midspan port will then adjust its output voltage to match the voltage present on the signal pair, preferably on a real-time basis.

Figure 10:
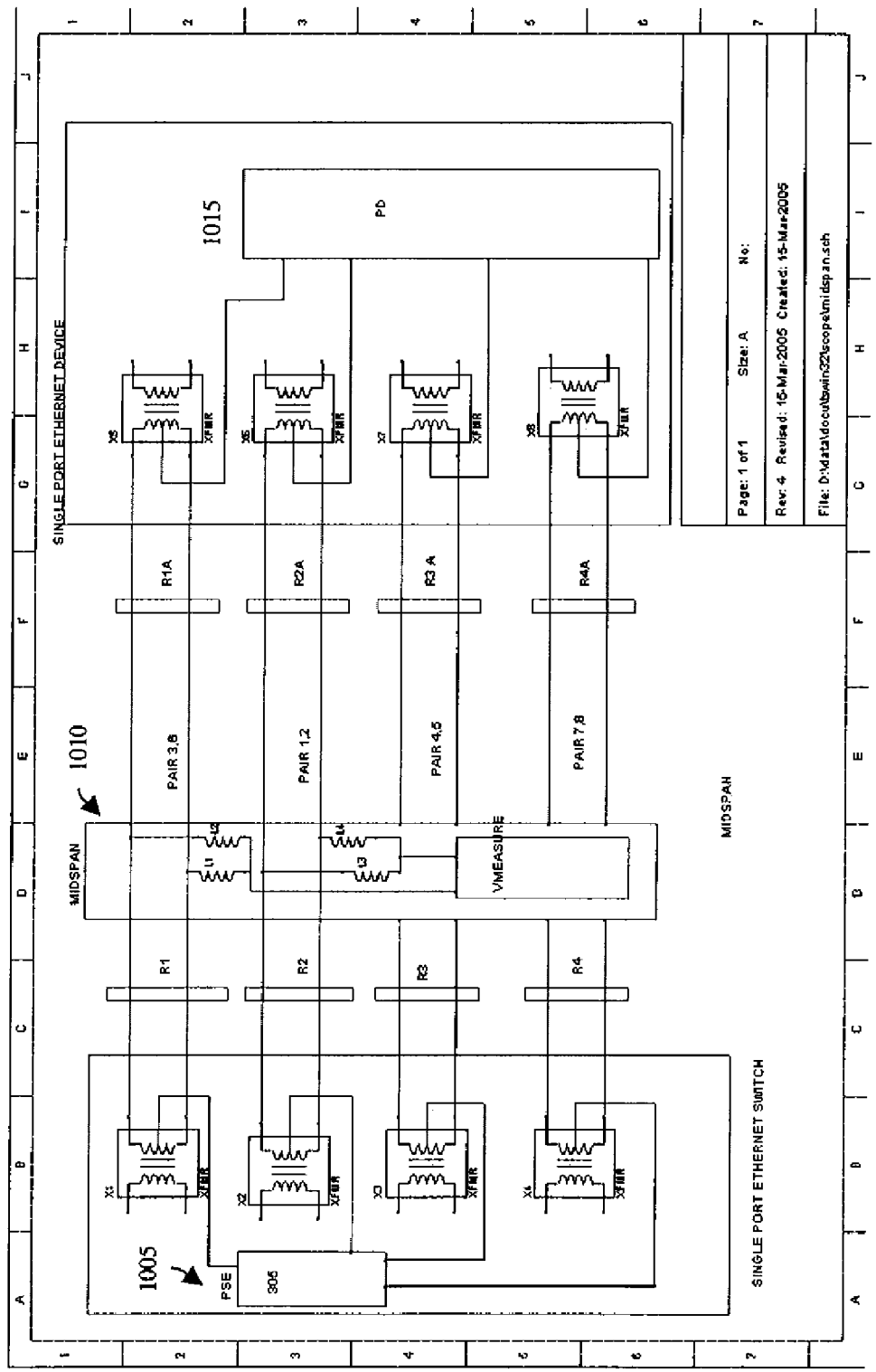
FIG. 10 is a further conceptual schematic diagram of a system implemented in a midspan device for delivering current down four conductor pairs to a PD in accordance with the teachings of this disclosure.

FIG. 10 is a block diagram of a midspan device 1010 coupled between a PSE 1005 and PD 1015. FIG. 10 illustrates balancing circuitry labeled VMEASURE being coupled to the signal pairs 1,2 and 3,6 through the autotransformers L1-L4. The balancing circuitry is configured to sense the voltage applied by the signal pairs 1,2 and 3,6 and adjust the voltage level applied to the unused pairs 4,5 and 7,8 accordingly. FIG. 10 illustrates a 10/100/1000 Ethernet connection where the midspan may elect to deliver power down the 4,5 and 7,8 pairs, while still passing data through such pairs. The balancing circuitry would still apply in this case.

It is contemplated that the functionality performed by the balancing circuitry may be accomplished in a variety of forms. For example, it is contemplated that the balancing circuitry may be embodied as a micro-processor-based solution, with the balancing operation being performed under software control. The balancing circuitry may also be embodied using discrete components, as will be described below.

Figure 11:
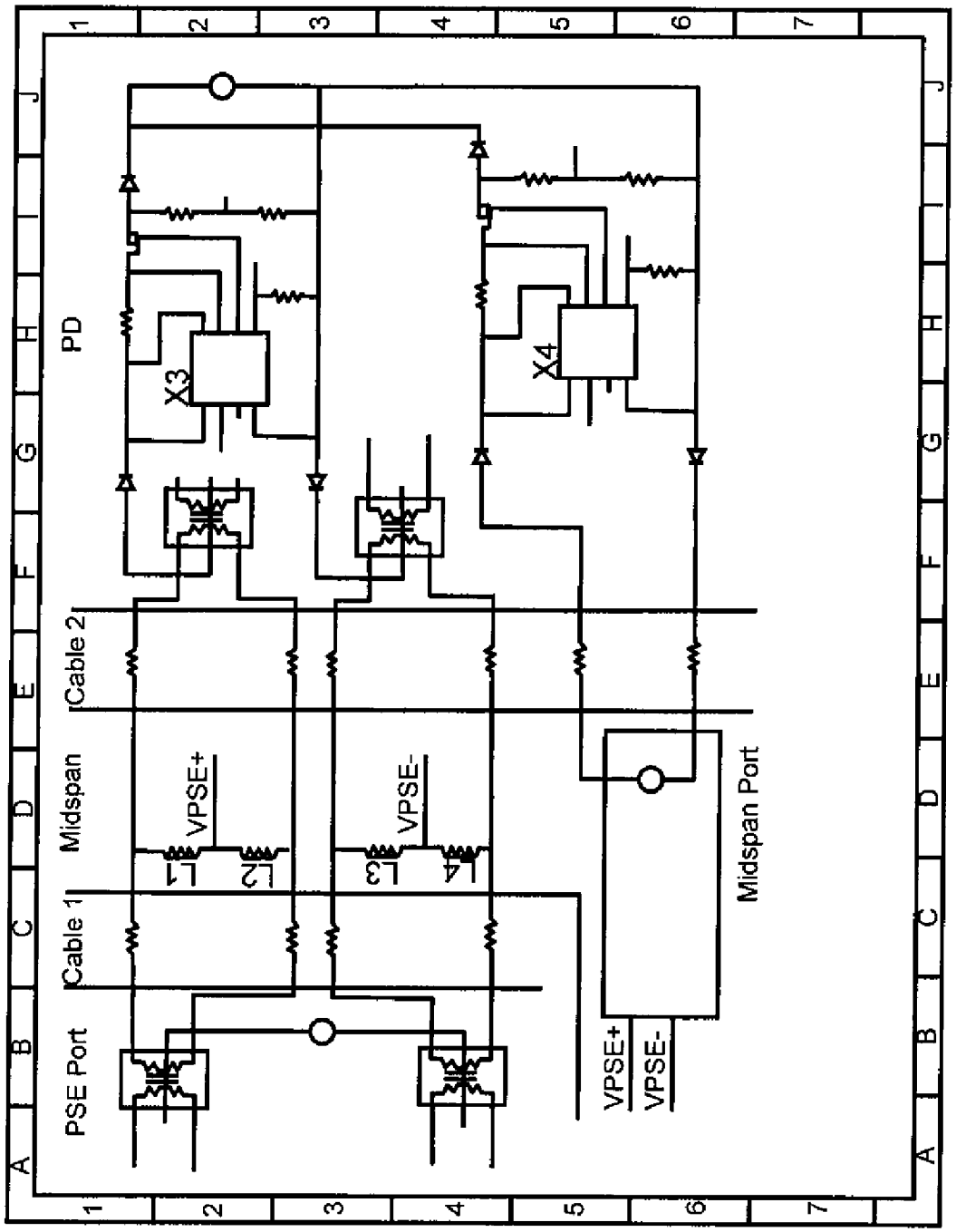
FIG. 11 is a further conceptual schematic diagram of a system implemented in a midspan device for delivering current down four conductor pairs to a PD in accordance with the teachings of this disclosure.

FIG. 11 is a diagram showing how the balancing circuitry may be deployed with the other aspects of this disclosure. The balancing circuitry 1110 is shown having two inputs labeled VPSE+ and VPSE−. L1, L2 and L3, L4 are autotransformers that are provided to tap off the power from the pairs to sense the VPSE+ and VPSE− voltages, respectively.

Cable1 and Cable2 are shown as cable resistance in the power path. Cable1 represents the cable between the PSE and the midspan device. Cable2 is the cable between the Midspan port and the PD. The PD of FIG. 11 is shown with the solution described above for compensating for the imbalance of cable resistance, using X3 and X4.

The midspan port has the PSE monitoring and balancing circuitry 1110 to adjust its output voltage based on the inputs of VPSE+ and VPSE−.

As can be seen from FIG. 11, the balancing circuitry 1110 may be used in conjunction with the biasing circuitry of X3 and X4, resulting in a dynamic power delivery system that can compensate both for variations in the PSE's output voltage and imbalances in cable resistance. Using such a system, in-line power may be delivered down all four pairs of an Ethernet cable to a PD in a safe and consistent manner.

Figure 12:
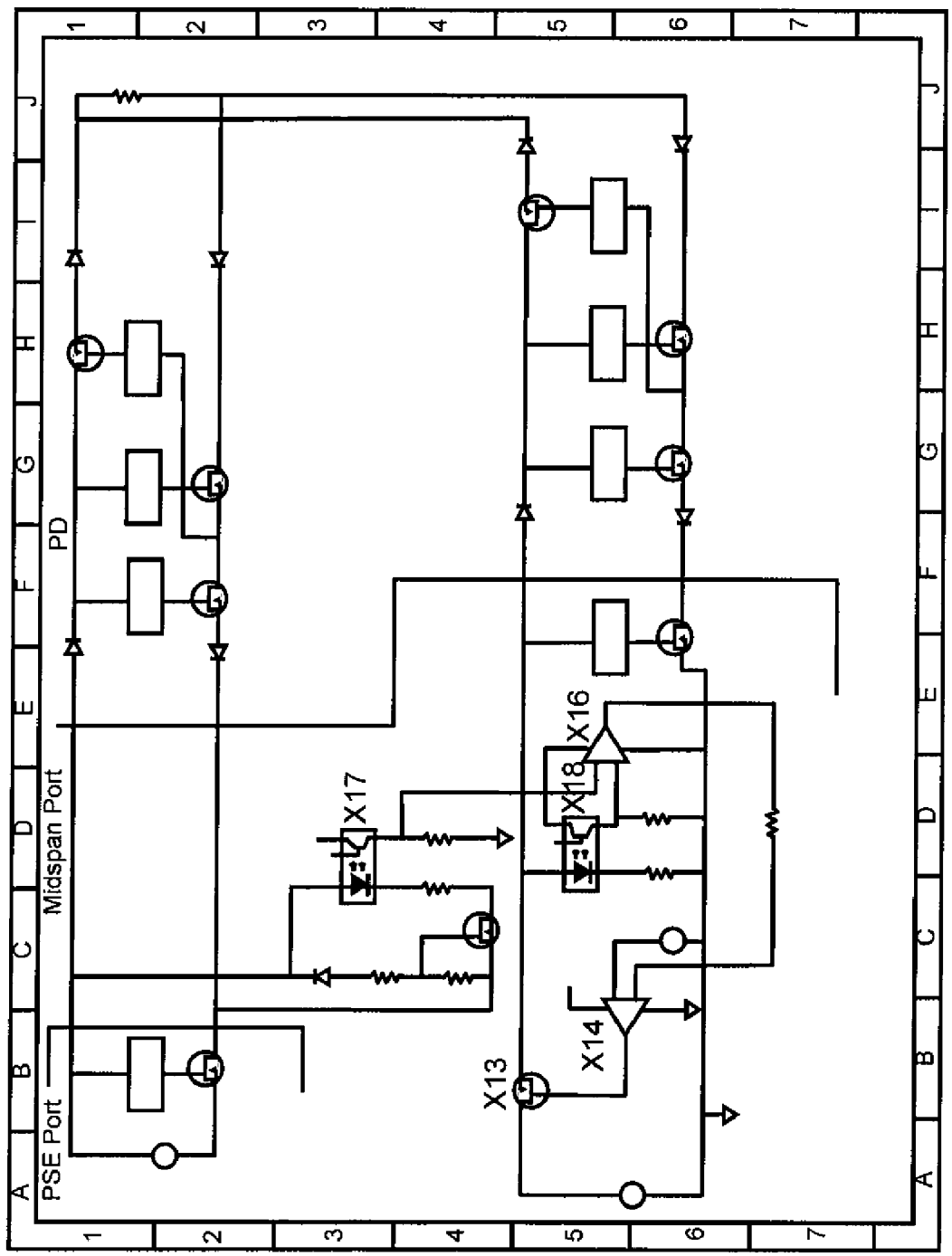
FIG. 12 is a schematic diagram of balancing circuitry implemented in a midspan device for delivering current down four conductor pairs to a PD in accordance with the teachings of this disclosure.

FIG. 12 is a more detailed diagram of balancing circuitry using discrete components. Discrete DC/DC converters can be used as the midspan port power supply because there is a feedback path where the output voltage is monitored and regulated to a set voltage. The output voltage can be changed in accordance with this disclosure by adding circuitry to this feedback path.

In the embodiment of FIG. 12, the midspan will measure the PSE voltage and compare it to its' own output voltage through the opto-isolators X17 and X18. The opto-isolators are provided to keep the PSE and midspan ports isolated from each other. The outputs of both opto-isolators are connected to the inputs of an operational-amplifier X16. As is known by those of ordinary skill in the art, the nature of an operational amplifier is to adjust its output to make both inputs the same potential. The output of X16 then goes to the feedback portion of the DC/DC converter. In FIG. 12, the DC/DC converter is represented as a voltage source, a MOSFET transistor X13, and an operational amplifier X14. In operation, V3 represents a reference voltage for X14. Based on the sensed difference, X13 is biased by X14 to balance the power.

Figure 13:
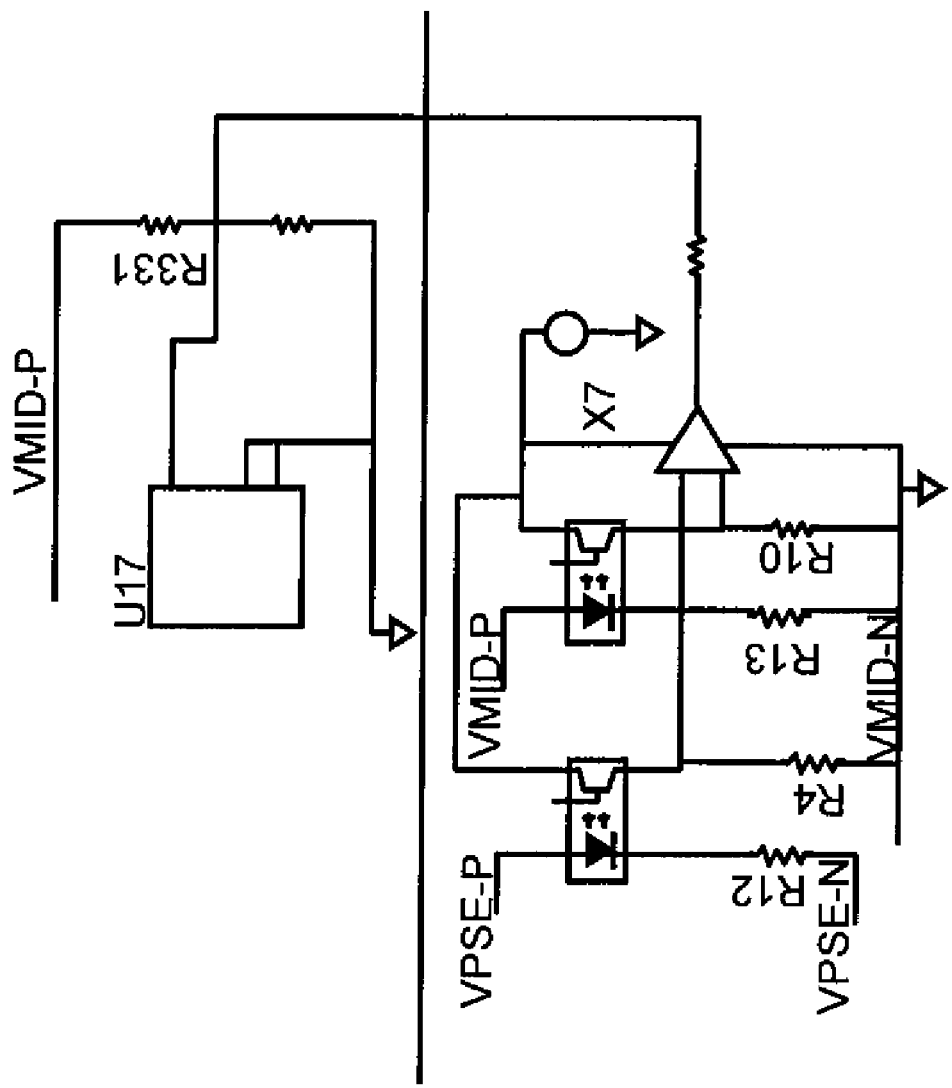
FIG. 13 is another schematic diagram of balancing circuitry implemented in a midspan device for delivering current down four conductor pairs to a PD in accordance with the teachings of this disclosure.

FIG. 13 is a schematic of another embodiment of balancing circuitry configured in accordance with the teachings of this disclosure. In operation, if the PSE port voltage (VPSE_P minus VPSE_N) is higher than the midspan port voltage (VMID_P minus VMID_N), the current through R12 will be greater than through R13 and the current through R4 will be greater than through R10. Therefore, the voltage on the negative input of operational amplifier X7 is higher than the positive input. The op-amp X7 will then decrease its output voltage.

A voltage reference U17 is provided that is a programmable reference, where the REF pin is 2.5V, though other values may be chosen. If the output of X7 decreases, more current will flow through R331 and therefore the midspan voltage will increase. The reverse happens if the PSE port voltage is less than the midspan voltage.

Thus, this disclosure enables high-power on 4 pairs with the PSE and midspan devices each providing 15 W. The midspan measures the PSE voltage, and will adjust its' own port voltage to track the PSE voltage. Given component tolerances and the like, voltage tracking will likely never be exactly equal, but a wide range of voltages may be compensated for. Any remaining variances in PSE and midspan port voltages and the differences in the cable resistances may then resolved by biasing circuitry provided for within the PD.

While embodiments and applications of this invention have been shown and described, it will now be apparent to those skilled in the art having the benefit of this disclosure that many more modifications than mentioned above are possible without departing from the inventive concepts disclosed herein. Therefore, the appended claims are intended to encompass within their scope all such modifications as are within the true spirit and scope of this invention.

What is claimed is:

1. A method for balancing power across conductors of a powered Ethernet connection comprising:

receiving power from an Ethernet Power Sourcing Equipment (PSE) on a first set of signal pair of a first Ethernet connection; sensing a voltage level of the power received on the first set of signals pairs of the first Ethernet connection;

providing on a second set of signal pairs of the powered Ethernet connection generated power to an Ethernet Powered Device (PD), where the generated power is substantially equal the power received on the first set of signal pairs of the first Ethernet connection; and providing the power received over the first set of signal pairs of the first Ethernet connection to the PD over a first set of signal pairs of the powered Ethernet connection.

2. The method of claim 1, further comprising sensing whether a current level in one or more of the first set of signal pairs and the second set of signal pairs of the powered Ethernet connection has exceeded a predetermined level.

3. The method of claim 2, further comprising lowering the current level in one or more of the first set of signal pairs and the second set of signal pairs of the powered Ethernet connection responsive to a determination that the current level has exceeded a predetermined level.

4. The method of claim 3, further comprising shutting down a port corresponding to one of the first set of signal pairs and the second set of signal pairs of the powered Ethernet connection in which the current level cannot be sufficiently lowered.

5. The method of claim 4, further comprising sensing the current level in the PD.

6. An Ethernet midspan device for balancing power across all conductors of a powered Ethernet connection comprising:
means for receiving power from an Ethernet Power Sourcing Equipment (PSE) on a first set of signal pairs of a first Ethernet connection; means for sensing a voltage level of the power received on the first set of signal pairs of the first Ethernet connection;
means for providing to an Ethernet Powered Device (PD), on a second set of signal pairs of the powered Ethernet connection, generated power substantially equal in voltage level to the power received on the first set of signal pairs of the first Ethernet connection; and
means for providing the power received on the first set of signal pairs of the first Ethernet connection to the PD over the first set of signal pairs of the powered Ethernet connection.

7. The midspan device of claim 6, where the PD further comprises means for sensing whether a current level in one or more of the first set of signal pairs and the second set of signal pairs of the powered Ethernet connection has exceeded a predetermined level.

8. The midspan device of claim 7, where the PD further comprises means for lowering the current level in one or more of the first set of signal pairs and the second set of signal pairs of the powered Ethernet connection responsive to a determination that the current level has exceeded a predetermined level.

9. The midspan device of claim 8, where the PD further comprises means for shutting down a port corresponding to one or more of the first set of signal pairs and the second set of signal pairs of the powered Ethernet connection in which the current level cannot be sufficiently lowered.

10. The midspan device of claim 8, where the PD further comprises means for shutting down a port corresponding to one or more of the first set of signal pairs and the second set of signal pairs of the powered Ethernet connection in which a short circuit condition has been sensed.

11. An Ethernet midspan device for balancing power across all conductors of a powered Ethernet connection comprising:
ports for receiving power from an Ethernet Power Sourcing Equipment (PSE) on a first set of signal pairs of a first Ethernet connection and ports for providing the power received on the first set of signal pairs of the first Ethernet connection to an Ethernet Powered Device (PD) over a first set of signal pairs of the powered Ethernet connection;
balancing circuitry disposed in the midspan device for sensing a voltage level of the power received on the first set of signal pairs of the first Ethernet connection and providing a second power source substantially equal to the power received on the first set of signal pairs of the first Ethernet connection; and
where the balancing circuitry is configured to provide the second power source to the PD over the second set of signal pairs of the powered Ethernet connection.

12. The midspan device of claim 11, where the PD further comprises circuitry for sensing whether a current level in one or more of the first set of signal pairs and the second set of signal pairs of the powered Ethernet connect has exceeded a predetermined level.

13. The midepan device of claim 12, where the PD further comprises circuitry for lowering the current level in one or more of the first set of signal pairs and the second set of signal pairs of the powered Ethernet connection responsive to a determination that the current level has exceeded a predetermined level.

14. The midspan device of claim 13, where the PD further comprises circuitry for shutting down a port corresponding to one or more of the first set of signal pairs and the second set of signal pairs of the powered Ethernet connection in which the current level cannot be sufficiently lowered.

15. The midspan device of claim 14, where the PD further comprises circuitry for shutting down a port corresponding to one or more of the first set of signal pairs and the second set of signal pairs of the powered Ethernet connection in which a short circuit condition has been sensed.

16. A method for balancing power across conductors of a powered Ethernet connection comprising:
receiving power from an Ethernet Power Sourcing Equipment (PSE) on a first set of signal pairs of a first Ethernet connection;
sensing a level of power received on the first set of signal pairs of the first Ethernet connection;
providing a second power source;
matching a voltage level of the second power source with a voltage level of the power received on the first set of signal pairs of the first Ethernet connection;
providing the power received on the first set of signal pairs of the first Ethernet connection to an Ethernet Powered Device (PD) over a first set of signal pairs of the powered Ethernet connection; and
providing power from the second power source to the PD over a second set of signal nairs of the powered Ethernet connection.

17. The method of claim 16, further comprising sensing whether a current level in one or more of the first set of signal pairs and the second set of signal pairs of the powered Ethernet connection has exceeded a predetermined level.

18. The method of claim 17, further comprising lowering the current level in one or more of the first set of signal pairs and the second set of signal pairs of the powered Ethernet connection responsive to a determination that the current level has exceeded a predetermined level.

19. The method of claim 18, further comprisng shutting down a port corresponding to one or more of the first set of signal pairs and the second set of signal pairs of the powered Ethernet connection in which the current level cannot be lowered.

20. The method of claim 19, further comprising sensing the current level in the PD.

21. The method of claim 1, where the second set of signal pairs of the powered Ethernet connection are unused signal pairs.

22. The method of claim 1, where the powered Ethernet connection and the first Ethernet connection are one of a 10 base T connection, a 100 base T connection, a 1000 base T connection, and a 10000 base T connection.

23. The method of claim 1, where the PSE and the PD operate substantially according to one of the IEEE802.3AT standard and the IEEE802.3AF standard.

24. The method of claim 1, where the first Ethernet connection and the powered Ethernet connection both utilize twisted pair cable, and where the first set of signal pairs includes one of a single pair of the twisted pair cable, and two pairs of the twisted pair cable; and where the second set of signal pairs includes one of a single pair of the twisted pair cable and two pairs of the twisted pair cable.

25. The method of claim 1, where the PD is one of a Voice Over Internet Protocol (VOIP) telephone, a wireless Local Area Network (LAN) access point, a network camera, remote network switch, a router, a hub, and an embedded computer.

* * * * *